US008719848B2

(12) United States Patent
Kaneko et al.

(10) Patent No.: US 8,719,848 B2
(45) Date of Patent: May 6, 2014

(54) INFORMATION PROCESSING DEVICE AND COMPUTER PROGRAM PRODUCT

(75) Inventors: Yu Kaneko, Kanagawa (JP); Shigeo Matsuzawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 421 days.

(21) Appl. No.: 13/223,583

(22) Filed: Sep. 1, 2011

(65) Prior Publication Data

US 2012/0110603 A1     May 3, 2012

(30) Foreign Application Priority Data

Oct. 29, 2010    (JP) .................................. 2010-244270

(51) Int. Cl.
*G06F 3/00*          (2006.01)
*G06F 9/54*          (2006.01)

(52) U.S. Cl.
CPC .. *G06F 9/547* (2013.01); *G06F 9/54* (2013.01)
USPC ........... 719/328; 713/175; 713/176; 713/179; 713/181

(58) Field of Classification Search
CPC ................................. G06F 9/547; G06F 9/54
USPC .................. 719/328; 713/175, 176, 179, 181
See application file for complete search history.

(56) References Cited

U.S. PATENT DOCUMENTS

| 2003/0061404 | A1* | 3/2003 | Atwal et al. ................... 709/328 |
| 2007/0204078 | A1* | 8/2007 | Boccon-Gibod et al. ....... 710/54 |
| 2007/0208744 | A1* | 9/2007 | Krishnaprasad et al. ......... 707/9 |
| 2008/0154916 | A1* | 6/2008 | Atashband ....................... 707/10 |
| 2008/0209451 | A1* | 8/2008 | Michels et al. ................ 719/328 |
| 2010/0223469 | A1* | 9/2010 | Hussain et al. ................ 713/175 |

FOREIGN PATENT DOCUMENTS

| JP | 2005-078339 | 3/2005 |
| JP | 2010-092407 | 4/2010 |
| WO | 2008/146408 | 12/2008 |

* cited by examiner

*Primary Examiner* — Emerson Puente
*Assistant Examiner* — Steven Do
(74) *Attorney, Agent, or Firm* — Nixon & Vanderhye, P.C.

(57) ABSTRACT

According to an embodiment, an information processing device offering various APIs stores, for every application program, a WSDL file which indicates definition information of an API which is permitted to be used by an application program, and developer information which specifies a developer of an application program. The information processing device releases to an application program a WSDL file corresponding to the application program, receives, through a web service, a request that is a request for use of a first API, determines whether or not the definition information of the first API is indicated in a first WSDL file corresponding to the first application program, and determines whether or not the first WSDL file is leaked, using developer information.

12 Claims, 11 Drawing Sheets

INFORMATION PROCESSING DEVICE AND COMPUTER PROGRAM PRODUCT

CROSS-REFERENCE TO RELATED APPLICATIONS

This application is based upon and claims the benefit of priority from Japanese Patent Application No. 2010-244270, filed on Oct. 29, 2010; the entire contents of which are incorporated herein by reference.

FIELD

Embodiments disclosed herein relate generally to an information processing device and a computer program product.

BACKGROUND

To develop or operate application programs of the same system, considered is the environment to prepare a platform for supporting development and operation of application programs. A platform is an information processing system in which a plurality of information processing devices work together to offer, to application programs, the functionality to support development and operation of application programs. For example, there is a platform which supports development and operation of game programs as application programs (hereinafter, simply referred to as games) executed by mobile terminals. In each game, a function of managing information of users (hereinafter, referred to as user information) who use the game is important. In these circumstances, if a platform provides the functionality to manage user information (hereinafter, referred to as a user information management function), game developers need not redundantly develop a program for implementing the same function. Furthermore, when a platform offers the functionality to access a database (hereinafter, referred to as a database function) to games, the platform is enabled to store therein data necessary for games, which may be beneficial to game developers in terms of a reduction in the game operational cost.

Since there are many game developers and furthermore the game developer and the platform developer are not always the same, it must be considered that the platform and game run on information processing devices that are physically separated. Therefore, the above-mentioned user information management function and database function need to be usable through a network. A web service is an example of a means to enable those functions to be used through a network. A platform defines and releases a web service API that is an application programming interface (API) necessary to use the user information management function or database function through a web service. Each game can use such functions through a network in a manner of using open web service APIs. Definition information (an API name, an argument, and a return value) of a web service API and a service release address of the web service API are described in a web services description language (WSDL) file. The WSDL can increase development efficiency and interoperability because it can clearly and strictly define the service release address and definition information of an API. For example, when a WSDL file exists, it is possible to automatically build a program that performs transmission and reception of messages necessary for use of a web service API.

The platform can earn income by preparing special web service APIs (hereinafter, referred to as special APIs), separately from web service APIs (hereinafter, referred to as basic APIs) for use of basic functions such as a user information management function and a database function. For example, in a case where a platform prepares special APIs such as an API that is fast accessible to a database and an API that is accessible to statistical data regarding users' game utilization results that are accumulated on the platform side, the platform can charge rates to the usage of the special APIs. Game developers having a goal of improving the quality of games or of developing games that use statistical data may use the special APIs by signing a contract for the usage of special APIs with the platform developer and paying a usage fee. In that case, the platform developer may want to release definition information of special APIs only to the game developers who have signed a contract. This is because the public release of definition information of special APIs to game developers who have not signed a contract leads to two disadvantages for the platform: first, the excessive processing load occurs in the platform due to access of games, developed by unauthorized developers, to the special API; and second, what data the platform has collected and stored is unintentionally disclosed through the definition information of APIs. For example, the fact that the platform has collected statistical data or the fact that the statistical data includes information such as total game utilization hours for each user may become disclosed. In other words, there is a concern that the clearness and strictness of WSDL may do harms rather than do goods.

In order to eliminate such disadvantages, there is offered a technique which creates, for each game, a WSDL file describing only definition information of APIs that are authorized to use the game.

In a case where a WSDL file is created for each game for limited release, any of game developers is not permitted to secondarily disclose or leak the WSDL file because the disadvantages set forth above are unavoidable if permitted. Therefore, platforms are desirably required to employ a mechanism capable of specifying the leakage origin when the secondary disclosure or leakage of the WSDL file occurs. The mechanism that can specify the leakage origin acts as a deterrent to the leakage of WSDL and enables the leakage origin to take legal responsibilities. However, in the related art methods, no consideration was given to a circumstance in which the leakage of a WSDL file occurred, and furthermore it was difficult to specify the leakage origin when a WSDL file was leaked.

DETAILED DESCRIPTION

According to an embodiment, an information processing device offers various application programming interfaces (APIs) used for enabling application programs to implement various functions. The information processing device includes a first storage unit configured to store therein, for each of the application programs, a web services description language (WSDL) file indicating definition information of an API which is permitted to be used by an application program; a second storage unit configured to store therein developer information specifying a developer of the application program; a releasing unit configured to release, to the application program, the WSDL file corresponding to the application program; a reception unit configured to receive, through a web service, a request for use of a first API by a first application program; a first determination unit configured to determine whether or not the definition information of the first API is indicated in a first WSDL file, of the WSDL files stored in the first storage unit, corresponding to the first application program, thereby determining whether or not the first application program is authorized for use of the first API; and a second determination unit configured to determine whether or not the first WSDL file is leaked, by using the developer information stored in the second storage unit when the first application program is determined as being unauthorized for use of the first API.

Various embodiments will be described hereinafter with reference to the accompanying drawings.

First Embodiment

Figure 1:
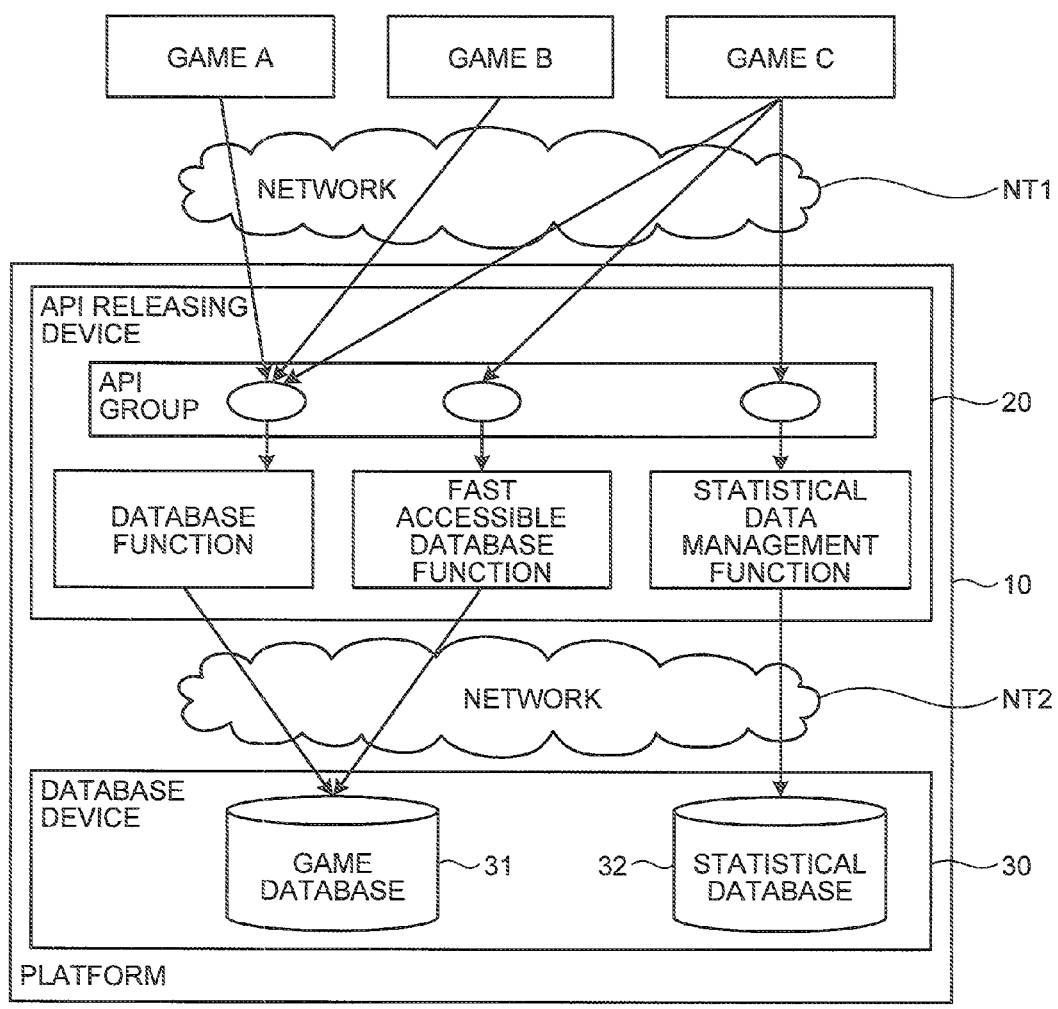
FIG. 1 is a diagram illustrating an example of the structure of an information processing system according to a first embodiment.

FIG. 1 is a diagram illustrating the structure of an information processing system according to a first embodiment. In this embodiment, information processing devices (also referred to as game servers) that develop and operate games A, B, and C as application programs are connected to the information processing system having one platform 10 through a network NT1. The Network NT1 is, for example, Internet and the like. The information processing system constitutes the platform 10 and includes an API releasing device 20 and a database device 30 that are information processing devices, each being different from the game server. These devices are connected through a network NT2. The network NT2 may be Internet like the network NT1. Alternatively, the network NT2 may be a local area network (LAN), an intranet, or the Ethernet (a registered trade mark). The API releasing device 20 is a device which provides web service APIs as various APIs for enabling a game to call various functions through a web service and which stores definition information of various APIs and programs for executing those functions, respectively. The database device 30 has a game database 31 which stores therein specific data for each game and a statistical database 32 which stores therein statistical data regarding game utilization history of each user or the like. To be specific, examples of the game specific data include score information representing scores that users have gained through a game, image files to be displayed on a game screen, and the like. The statistical data is data showing the total number of times of each game being used, the total hours per game used, and the like. Each game server implements various functions, which the platform 10 provides through the network NT1, by using web service APIs offered through the API releasing device 20.

Hereinafter, a description is made with respect to a web service API provided through the API releasing device 20 according to this embodiment. It is assumed that the Web service API includes three APIs: a DB API, a fast accessible DB API, and a statistical data API. The function implemented by the DB API is referred to as a database function, the function implemented by the fast accessible DB API is referred to as a fast accessible database function, and the function implemented by the statistical data API is referred to as a statistical data management function. The database function is a function for accessing game specific data. That is, the database function stores the data in the game database 31 and/or reads the data from the game database 31. The fast accessible database function is a function for accessing game specific data faster than the database function. The statistical data management function is a function for accessing statistical data. This function stores statistical data in the statistical database 32 and/or reads the statistical data from the statistical database 32. Among these APIs, the DB API is categorized as a basic API, and the fast accessible DB API and statistical data API are categorized as special APIs. A special API refers to an API permitted for use by only games having signed a contract. In FIG. 1, it appears that only the game C has signed a contract for use of special APIs and therefore the game C can use all the basic API and special APIs. In addition, it also appears that the game A and game B have not signed a contract for use of special APIs and therefore the game A and game B can use only the basic API.

Hereinafter, a description will be made with respect to the hardware structure of the information processing device including the game server, the API releasing device 20, and the database device 30. The information processing device includes: a control unit such as a central processing unit (CPU) that controls the whole device; a main storage unit such as a read only memory (ROM) or a random access memory (RAM) that stores therein a variety of data and various programs; and an auxiliary storage unit such as a hard disk drive (HDD) or a compact disk (CD) drive that stores therein a variety of data and various programs. That is, the information processing device has the hardware structure using a normal computer. In addition, the information processing device is connected, in a wired or wireless manner, with a display unit that displays information thereon, an operational input unit such as a keyboard or a mouse that allows entry of instructions by the user, and a communication interface (I/F) which controls communication with external devices.

Figure 2:
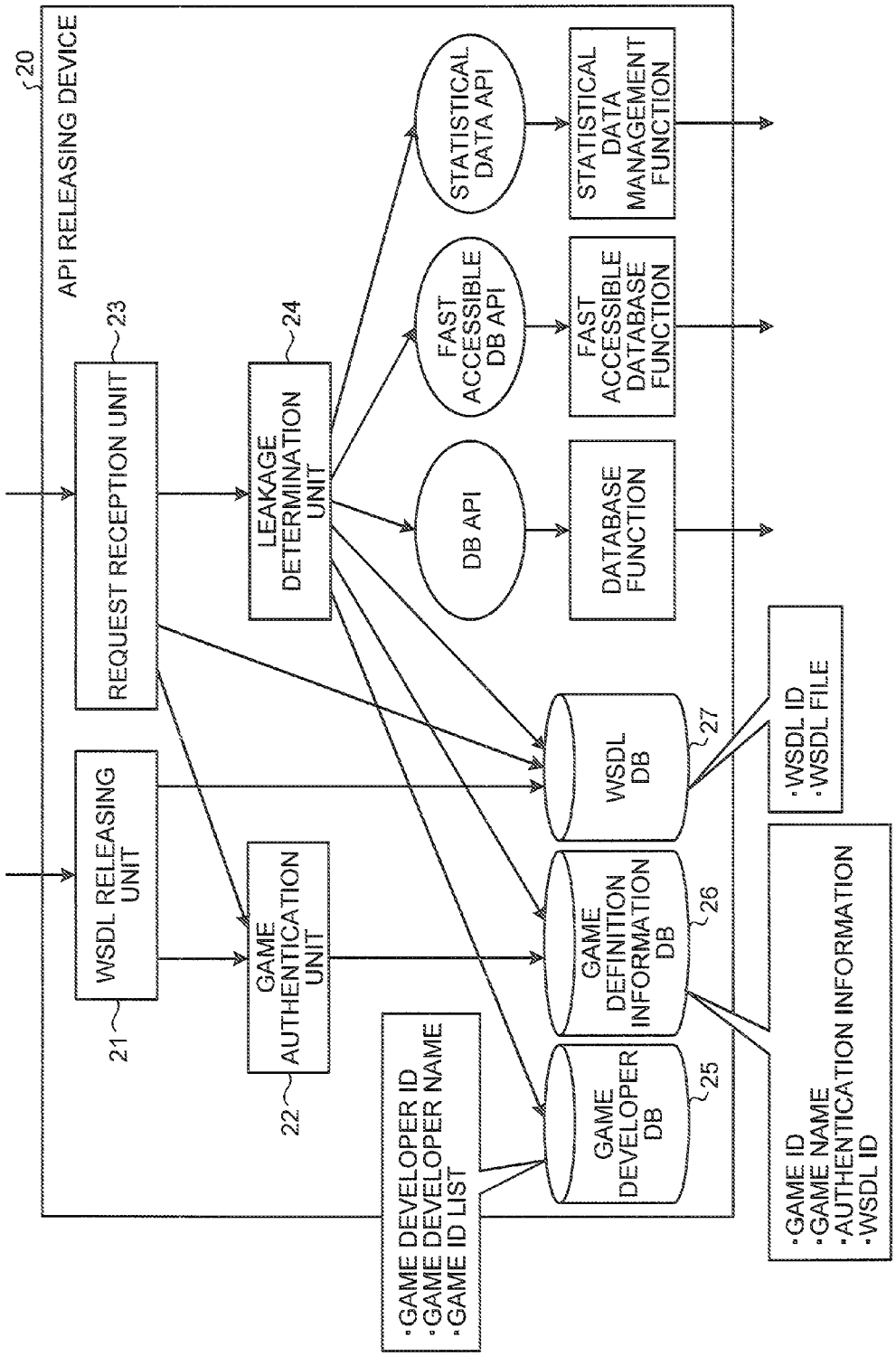
FIG. 2 is a diagram illustrating the functional structure of an API releasing device.

Next, the functional structure of the API releasing device 20 having the particular hardware structure which is described above will be described with reference to FIG. 2. The API releasing device 20 includes a web service description language (WSDL) releasing unit 21, a game authentication unit 22, a request reception unit 23, a leakage determination unit 24, a game developer DB 25, a game definition information DB 26, and a WSDL DB 27. The WSDL releasing unit 21 and request reception unit 23 are implemented by executing, by the CPU of the API releasing device 20, various programs stored in the main storage unit or the auxiliary storage unit and by using the communication I/F. Each of the game authentication unit 22 and the leakage determination unit 24 is implemented by executing, by the CPU of the API releasing device 20, various programs stored in the main storage unit and/or auxiliary storage unit. The game developer DB 25, the game definition information DB 26, and the WSDL DB 27 are stored in the auxiliary storage unit such as a HDD.

The WSDL DB 27 stores therein WSDL information for each game. The WSDL information includes a WSDL ID and a WSDL file. The WSDL ID is an ID allocated to a WSDL file and to WSDL information containing the WSDL file, so that the WSDL file can be identified. The WSDL file indicates information (hereinafter, referred to as API definition information) on a definition of an API which is permitted for use by a game, and a service release address which is allocated to the game. The API definition information indicates a name, an argument, and a return value. The service release address is information of an address where a web service is available. It is, for example, expressed in a character string of the URI (Uniform Resource Identifier) format called an end point reference (EPR). Different games have different service release addresses. With use of this kind of WSDL file, it is possible to improve the development efficiency of a game which uses a web service.

The game definition information DB 26 stores therein game definition information regarding games on a game-by-game basis. The game definition information includes a game ID, a game name, authentication information, and a WSDL ID. The game ID is identification information allocated to a game in order to identify the game uniquely. The game name is the name of a game. The authentication information is information for authentication of a game. For example, the authentication information indicates a password string or a client certificate. The WSDL ID is a WSDL ID allocated to a WSDL file which is permitted for release to a particular game.

The game developer DB 25 stores therein, for each of game developers, game developer information which specifies each game developer. The game developer information includes a game developer ID, a game developer name, and a list of game IDs. The game developer ID is an ID allocated to a game developer, so that the game developer is identified. The game developer name is the name of a game developer. The game ID list lists all game IDs of games that a particular game developer develops.

The WSDL releasing unit 21 releases API definition information in the form of a WSDL file. In this embodiment, releasing a WSDL file is implemented through a network NT1, for example, Internet or the like, in terms of convenience. That is, the game server operated by a game developer acquires API definition information by receiving a WSDL file from the API releasing device 20 through the network NT1. In order to enable this, the platform 10 causes the WSDL releasing unit 21 to be public on the network NT1 and receives an HTTP request from the game server. In this case, the game server serves, for example, as an HTTP client. The HTTP client is, for example, a web browser. In this structure, the game server sends the API releasing device 20 a request for a WSDL file and to which a game ID and authentication information are added. When the WSDL releasing unit 21 receives this request, the WSDL releasing unit 21 transfers the game ID and authentication information added to the request to the game authentication unit 22 to be described below, thereby requesting the game authentication unit 22 to execute a game authentication process. When the WSDL releasing unit 21 receives the game definition information from the game authentication unit 22 as a result of the game authentication process, the WSDL releasing unit 21 acquires, from the WSDL DB 27, a WSDL file in compliance with the request using the game definition information, and transmits the acquired WSDL file to the game server.

The request reception unit 23 is a unit to receive a request for API, which is transmitted from the game server to develop a game to the platform 10, and to which a game ID and authentication information, and API definition information and a service release address of the API are added. Prior to the reception of this request, at a timing at which the API releasing device 20 is activated, the request reception unit 23 performs a initialization process in order to grasp in advance a release status such that what APIs are released at which release address to games. In the initialization process, by referring to the WSDL DB 27, the request reception unit 23 acquires the API definition information and service release address of the API capable of being released by the API releasing device 20. Then, the request reception unit 23 starts expecting a request for API. After that, when the request for API is received, the request reception unit 23 determines whether or not the requested API is one of APIs capable of being released by the API releasing device 20, making use of the API definition information and the service release address added to the request. According to the result of determination, the request reception unit 23 transfers the game ID and the authentication information which are added to the request, to the game authentication unit 22, thereby requesting an execution of a game authentication process. If the game definition information is acquired from the game authentication unit 22 as a result of the game authentication process, the request reception unit 23 transfers the game definition information and the request to the leakage determination unit 24 to be described below. As a result of the determination of the leakage determination unit 24, when the request reception unit 23 receives an error from the leakage determination unit 24, it transfers this error to the game server that is the origin of the request.

In response to the request from the WSDL releasing unit 21 or from the request reception unit 23, the game authentication unit 22 refers to the game definition information DB 26 using the game ID and authentication information, and hence performs the game authentication process for authenticating the game. When the game is successfully authenticated, the game authentication unit 22 obtains the definition information of the game from the game definition information DB 26, and returns this to the WSDL releasing unit 21 or to the request reception unit 23, which is the request origin of an execution of the game authentication process. In contrast, when the authentication of the game fails, the game authentication unit 22 returns an error to the WSDL releasing unit 21 or to the request reception unit 23, which is the request origin of an execution of the game authentication process.

The leakage determination unit 24 determines whether or not the WSDL file was leaked, by using the game definition information and the request which are transferred from the request reception unit 23 and by referring to the game developer DB 25, the game definition information DB 26, and the WSDL DB 27. As a result of the determination, when it is determined that the WSDL file is leaked, the leakage determination unit 24 returns an error to the request reception unit 23. In contrast, when it is determined that the WSDL file is not leaked, the leakage determination unit 24 transfers the game definition information and the request, to the API which is the subject of the request for use. In this embodiment, APIs which are permitted to be used are the DB API, fast accessible DB API, and statistical data API. Hereinafter, the outline of these APIs will be briefly described.

As examples of the DB API, there are put(key, data) and get(key). The put(key, data) is an API to store data in association with a key in the game database 31. The get(key) is an API to acquire data corresponding to a key from the game database 31. In addition, as another example of the DB API, there may be an API to store multiple pieces of data in the game database 31 at one time.

As examples of the fast accessible DB API, for example, there are fastPut(key, data) and fastGet(key). The fastPut(key, data) is an API to store data in association with a key in the game database 31 at high speed. The fastGet (key) is an API to acquire data corresponding to a key from the database device 30 at high speed. Thanks to fast accessing to data which is enabled by the fast accessible DB API, for example, the communication time can be reduced through compression of the messages of requests and responses, and prioritization of each process of dealing with request and use of a cache can be realized.

As examples of the statistical data API, for example, there are getUseCount(game ID) and getUseTime(game ID). The getUseCount(game ID) is an API to acquire the total number of times of being used which is indicated by the statistical data. The getUseTime(game ID) is an API to acquire the total utilization hours indicated by the statistical data.

Figure 3:
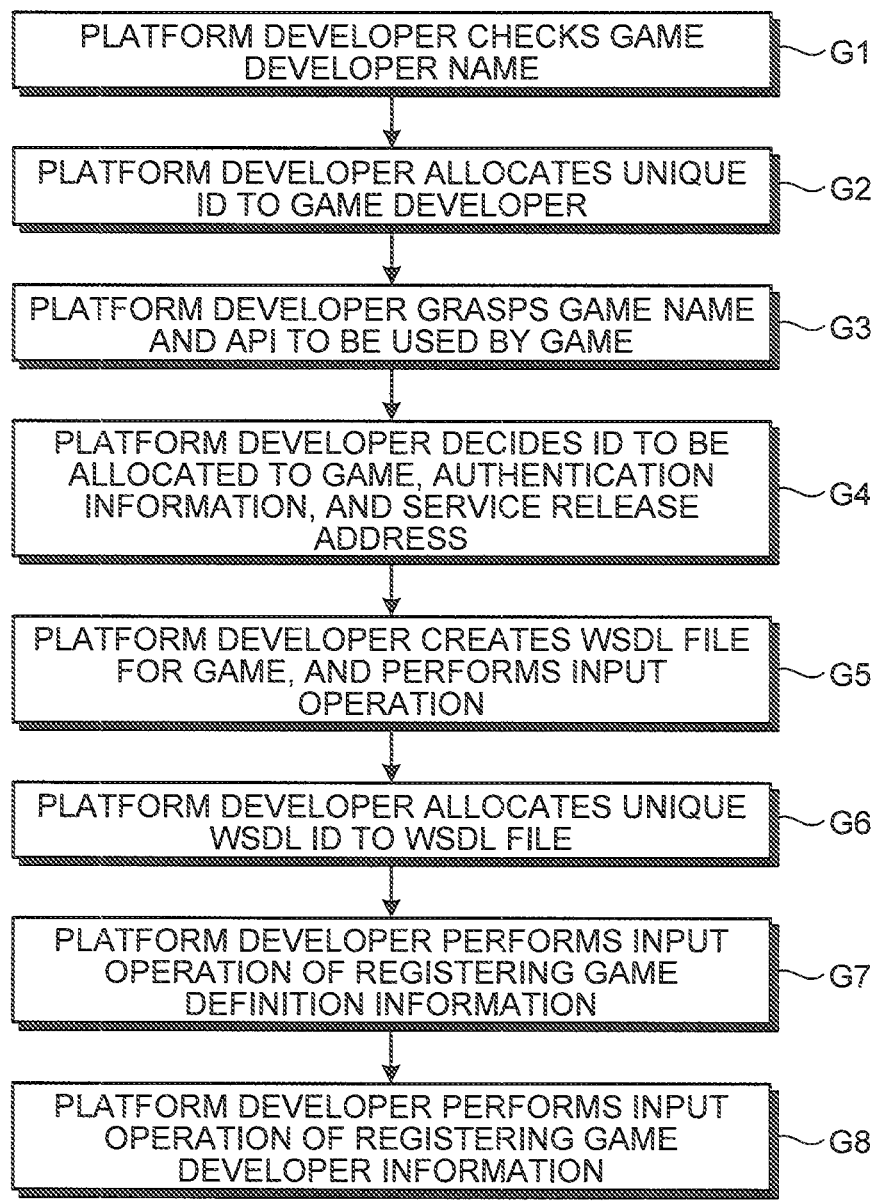
FIG. 3 is a diagram illustrating a business flow at the time of making a contract.
Figure 4:
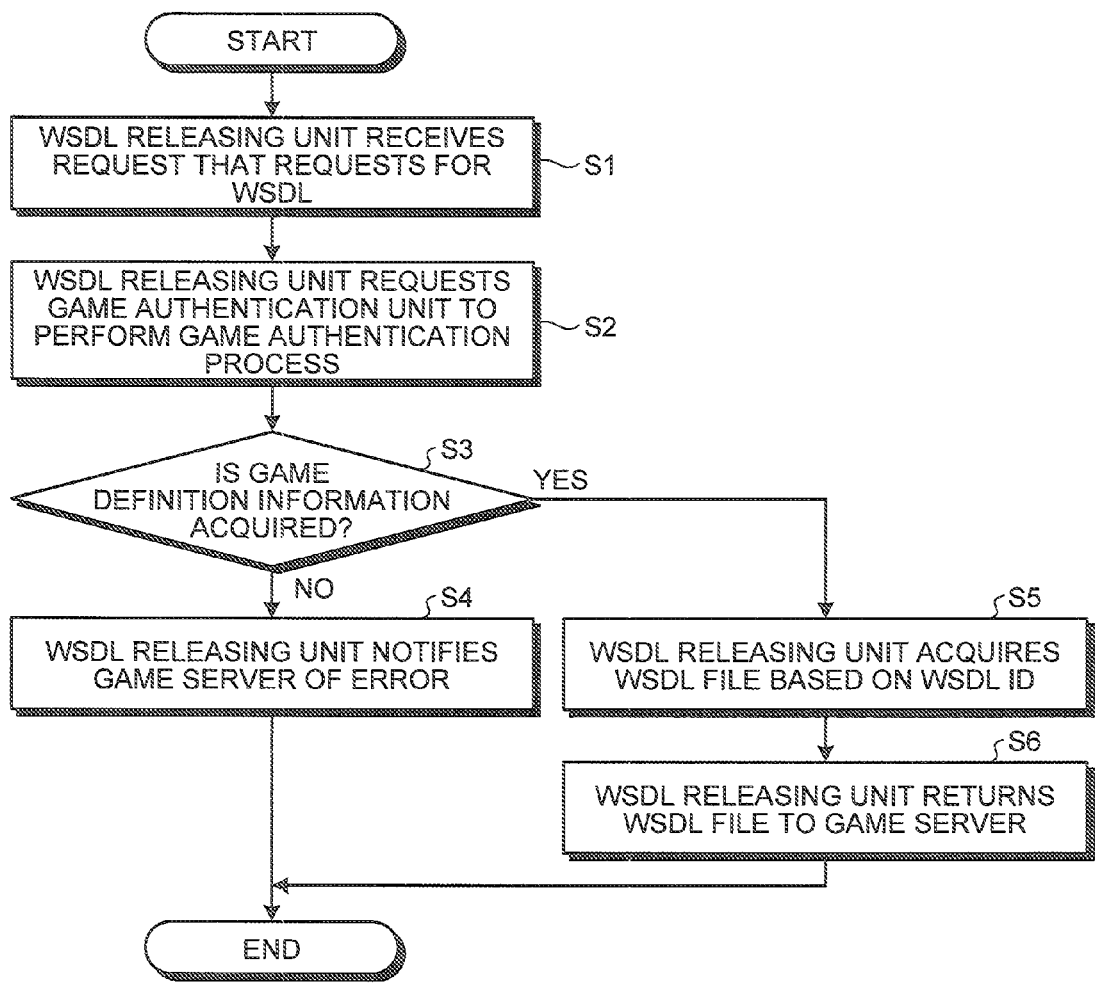
FIG. 4 is a flowchart illustrating the procedure of a process for releasing a WSDL file.

Next, a description will be made with respect to an exemplary business flow for a game developer and a platform developer according to this embodiment. A game developer needs to sign a basic agreement or a special contract with a platform developer at the time of developing a game. By these agreements or contracts, functions and APIs that can be used by a game to be developed by the game developer are decided. FIG. 3 is a diagram illustrating a business flow at the time of making a contract. The platform developer grasps a game developer's name (Business step G1). The platform developer uniquely allocates a game developer ID to a the game developer (Business step G2). The platform developer grasps the game name and APIs to be used by a game (Business step G3). The platform developer decides a game ID to be uniquely allocated to the game, a service release address and authentication information, and informs the game developer of these (Business step G4). As described later, in the game server which is operated by a game developer of a game who has signed a contract, when the game sends a request for API through a Web service, if the game ID and authentication information are added to the request, the game can be successfully authenticated in the API releasing device 20.

The platform developer performs an input operation of creating a WSDL file that describes API definition information of an API used by a game and the service release address decided in Business step G4, by using the operational input unit of the API releasing device 20 (Business step G5). In the API releasing device 20 that has been subjected to this input operation, the WSDL file is created. Here, one WDSL file is created for each game, and each WSDL files have unique service release addresses. Accordingly, when a particular WSDL file is leaked out, the leakage origin can be specified. The platform developer allocates a unique WSDL ID to a WSDL file, and performs an input operation of registering WSDL information, which includes a WSDL file and a WSDL ID therein, in the WSDL DB 27 (Business step G6). In the API releasing device 20 which has been subjected to the input operation, the WSDL file is stored in the WSDL DB27. The platform developer performs an input operation of inputting a game name which is decided in Business step G4 and a game ID, and performs an input operation of creating game definition information which includes authentication information and the WSDL ID which is allocated in Business step G6. After that, the platform developer performs an input operation of registering the particular game definition information in the game definition information DB 26 (Business step G7). In the API releasing device 20 which has been subjected to the input operation, game definition information is created and then stored in the game definition information DB 26. The platform developer performs an input operation of inputting a game developer ID and a developer name and performs an input operation of creating game developer information including the game ID allocated in Business step G4. Then, the platform developer performs an input operation of registering the particular game developer information in the game developer DB 25 (Business step G8). In the API releasing device 20 which has been subjected to the input operation, game developer information is created and then stored in the game developer DB.

Next, a description will be made with respect to the procedure of a process performed by the API releasing device 20. Described first is the procedure of a process that the API releasing device 20 releases a WSDL file in compliance with a request from the game server. In order to develop a game by using an API which is offered by the platform 10 through a Web service, it is necessary for a game developer to acquire a WSDL file which indicates API definition information of the particular API, from the platform 10. Because of this, if the game developer performs an input operation for acquiring the WSDL file using the operational input unit of the game server, the game server accepts this input operation, and sends a request which requests the API releasing device 20 to send the WSDL file and to which the authentication information and the game ID allocated to the game are added. Adding the authentication information to the request, for example, is implemented in the following manner when the authentication information indicates a character string of a password. The WSDL releasing unit 21 of the API releasing device 20 causes a dialog to be displayed, to allow an entry of strings of a game ID and a password, on a Web browser of the game server, and then allows the game developer to input the character strings of a game ID and a password. Accordingly, a Web browser of the game server adds the input character strings of the game ID and the password to the request, and sends this resultant request to the WSDL releasing unit 21 of the API releasing device 20, which enables the HTTP digest authentication to be performed.

When the request is received (Step S1), the WSDL releasing unit 21 of the API releasing device 20 transfers the request to the game authentication unit 22, and requests the game authentication unit 22 to execute a game authentication process (Step S2). The details of the game authentication process will be described later. After that, the WSDL releasing unit 21 receives the result of the game authentication process from the game authentication unit 22 and determines whether or not the game definition information is acquired (Step S3). When the game definition information is not acquired (No in Step S3), authentication of the game is determined as failure. In this case, the WSDL releasing unit 21 transmits an error message representing the fact that authentication of the game failed, to the game server (Step S4). When the game definition information is acquired (Yes in Step S3), authentication of the game is determined as success. In this case, the WSDL releasing unit 21 accesses the WSDL DB 27 and acquires WSDL information including a WSDL ID which is identical to the WSDL ID which is included in the game definition information (Step S5). Next, the WSDL releasing unit 21 transmits the WSDL file which is included in the WSDL information acquired, to the game server (Step S6).

Figure 5:
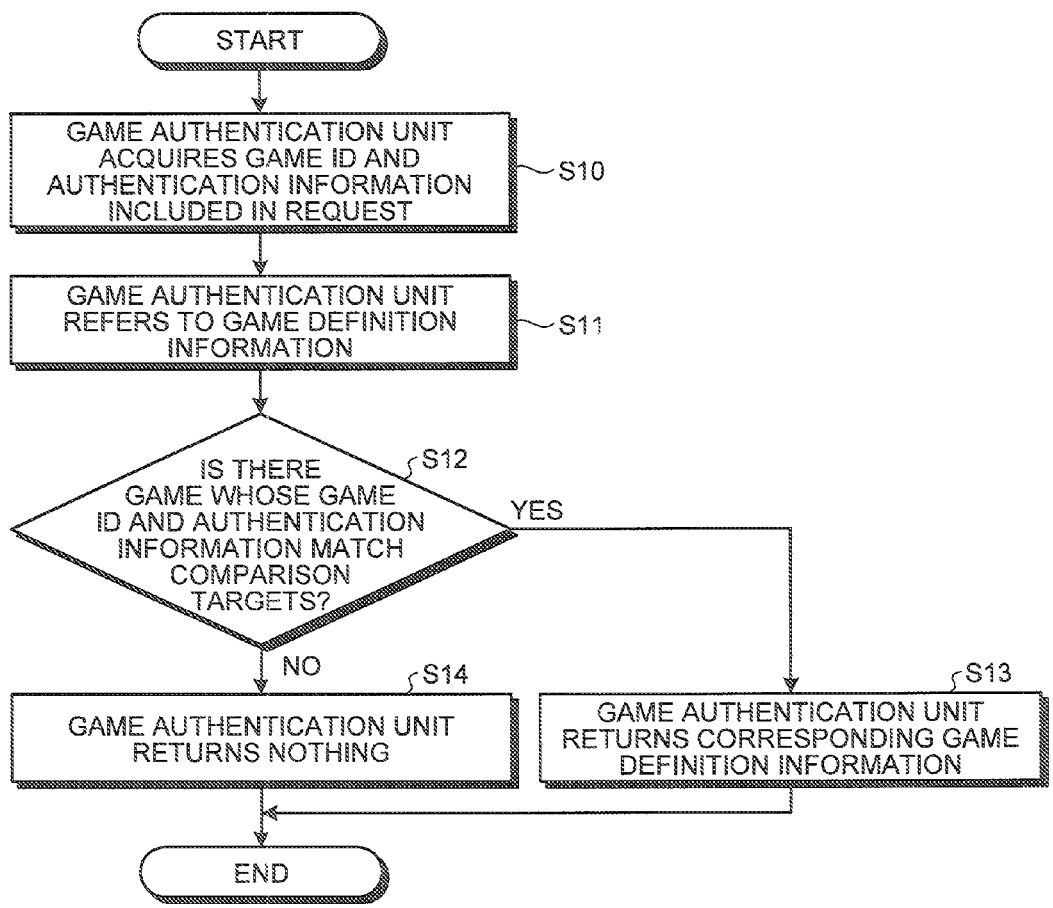
FIG. 5 is a flowchart illustrating the procedure of a game authentication process.

Next, with reference to FIG. 5, a description will be made with respect to the procedure of the game authentication process performed by the game authentication unit 22 in Step S2. When a request is received from the WSDL releasing unit 21, the game authentication unit 22 acquires a game ID and the authentication information which are added to the request (Step S10). If the game ID and authentication information are not added to the request, the game authentication unit 22 returns an error representing the fact that authentication of the game failed, to the WSDL releasing unit 21.

The game authentication unit 22 accesses the game definition information DB 26 (Step S11), and determines whether or not there is game definition information which includes a game ID and authentication information which are respectively identical with the game ID and authentication information which are acquired in Step S10 (Step S12). When the relevant game definition information exists (Yes in Step S12), authentication of the game will be determined as success. In this case, the game authentication unit 22 returns the relevant game definition information to the WSDL releasing unit 21 (Step S13). When the relevant game definition information does not exist (No in Step S12), authentication of the game is determined as failure. In this case, the game authentication unit 22 returns nothing to the WSDL releasing unit 21 (Step S14) and the game authentication process ends.

As described above, by using authentication information which is decided at the time of making a contract, the API releasing device 20 can discard the request transmitted from the game server which develops a game which is not contracted.

Figure 6:
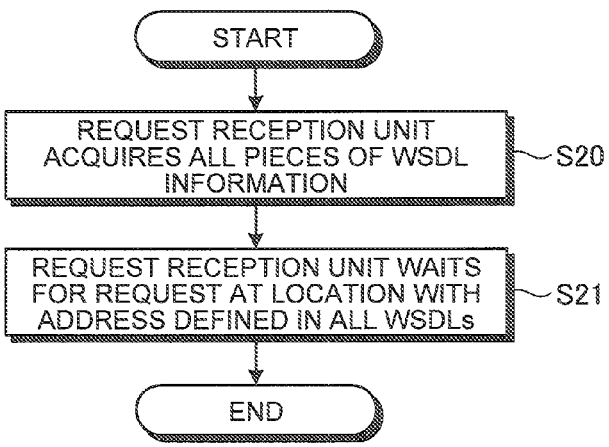
FIG. 6 is a flowchart illustrating an initialization process that is performed when the API releasing device is activated.

Next, a description will be made with respect to the procedure for processing a request which requests for API. Here, an initialization process which is performed when the API releasing device 20 is activated will be described with reference to FIG. 6. If the API releasing device 20 is activated, the request reception unit 23 refers to the WSDL file included in all pieces of WSDL information stored in the WSDL DB27 (Step S20), and determines where (at which service release address) what APIs are to be released, using the API definition information and service release address indicated by each WSDL file (Step S21). That is, the request reception unit 23 acquires API definition information of an API that can be released by the API releasing device 20, and a service releasing address, and then starts expecting a request for API.

Figure 7:
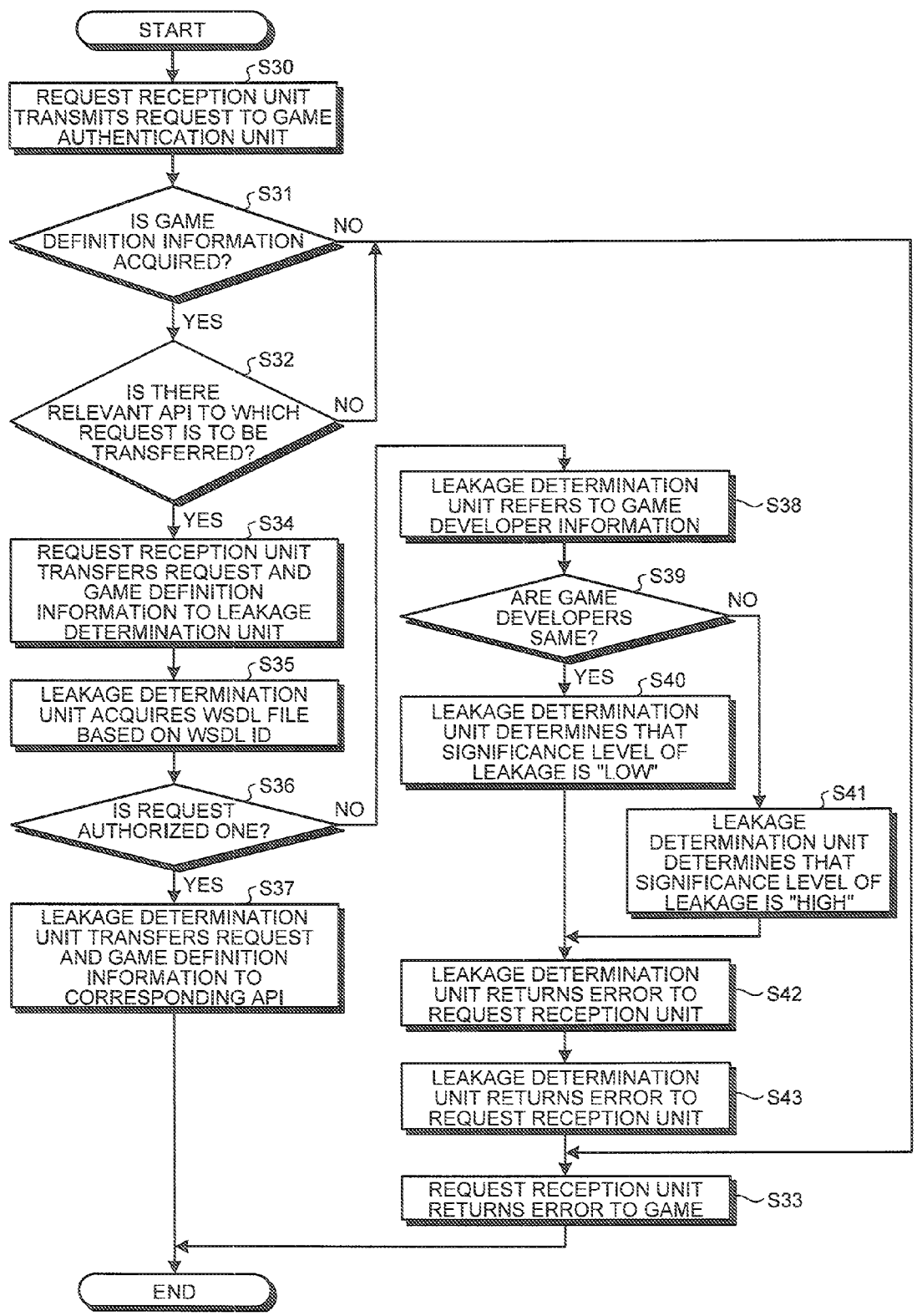
FIG. 7 is a flowchart illustrating the procedure for processing a request that requests permission of use of an API.

Next, a description is made, with reference to FIG. 7, in connection with the procedure of a process performed when the API releasing device 20 receives a request for API, from the game server. The game server transmits a request for an API and to which a game ID and authentication information of a game that is to use the API, and API definition information and a service release address of the API are added. Hereinafter, this game is referred to as a game G, and this request is referred to as a request R. Herein, the request is supposed to be a SOAP request. When the request R is received, the request reception unit 23 of the API releasing device 20 transfers the request R to the game authentication unit 22 and requests the game authentication unit 22 to execute the game authentication process (Step S30). Since the procedure of this game authentication process is almost the same as the procedure which is described above and illustrated in the FIG. 5, a description thereof will not be redundantly presented here. Herein, the origin of the request that the game authentication unit 22 receives in Step S10 is the request reception unit 23; the destination to which the game authentication unit 22 returns an error when the game ID and authentication information are not added to the request is the request reception unit 23; and the destination to which the game authentication unit 22 returns the game definition information in Step S13 is the request reception unit 23.

From the result of the game authentication process, the request reception unit 23 determines whether or not the game authentication unit 22 has successfully acquired the game definition information (Step S31). If the game definition information is not successfully acquired (No in Step S31), the authentication of the game G fails. In this case, the process proceeds to Step S33. In contrast, if the game definition information is successfully acquired (Yes in Step S31) the authentication of the game G succeeds. In this case, the request reception unit 23 determines whether or not the API is an API capable of being released by the API releasing device 20 by referring to the API definition information and service release address added to the request R (Step S32). To be specific, the request reception unit 23 determines whether or not there is an API (herein, referred to as an API a) corresponding to the API definition information and service release address which are added to the request R, on the basis of the API definition information and service release address which are acquired by the above-described initialization process. When the API α does not exist (No in Step S32) the process proceeds to Step S33. In contrast, when the API α exists (Yes in Step S32) the request reception unit 23 transfers the request R and the game definition information of the game G to the leakage determination unit 24 (Step S34).

When the request R and the game definition information are received, the leakage determination unit 24 specifies WSDL information which includes a WSDL ID identical with the WSDL ID included in the game definition information, and acquires the WSDL file which is included in the WSDL information from the WSDL DB 27 (Step S35). Next, the leakage determination unit 24 checks whether the use of the API α which is requested with the Request R is authorized (Step S36). That is, the leakage determination unit 24 determines whether or not the game G is the game which is permitted to use the API α. When two conditions below, (a) and (b), are satisfied, the use of the API α which is requested with the Request R is determined as being authorized by the leakage determination unit 24:

(a) In the WSDL file which is acquired in Step S35, the API definition information of the API α is indicated; and (b) The service release address which is indicated by the WSDL file which is acquired in Step S35 is identical with the service release address which is added to the request R.

When the use of the API α which is requested with the request R is determined as being authorized (Yes in Step S36), the leakage determination unit 24 transfers the request R and the game definition information of the game G to the API α (Step S37). The API α is one of the DB API, the fast accessible DB API, and the statistical data API mentioned above.

When the use of the API α which is requested with the request R is determined as being unauthorized (No in Step S36), a determination cannot be made, yet at this point, of whether the WSDL file which indicates the API definition information of the API α is leaked out. This is because there remains the possibility that the developer of the game G is identical with the game developer of the game which is permitted to use of the API α remains. Because of this, the leakage determination unit 24 determines whether or not the developer of the game G is identical with the game developer of the game which is permitted to use the API (Step S39), by referring to all pieces of game developer information which are stored in the game developer DB 25 (Step S38). To be specific, the determination is made in the following manner. The leakage determination unit 24 refers to the game ID which is indicated by the game ID list included in all pieces of information of the game developer information which are stored in the game developer DB 25, and acquires the game developer information including the game ID list which indicates the game ID of the game G. The leakage determination unit 24 refers to the game definition information DB 26, and acquires the game definition information which includes the game ID identical with the game ID which is listed in the game ID list included in the game developer information acquired. The leakage determination unit 24 refers to the WSDL DB 27, and acquires the WSDL information which includes a WSDL ID identical with the WSDL ID which is included in the game definition information, and hence acquires the WSDL file which is included in the WSDL information acquired. The leakage determination unit 24 determines that the game developer of the game G is the same as the game developer of the game which is permitted to use the API α if the API definition information of the API α is included in the WSDL file, but determines that both of the game developers are not the same if the API definition information of the API α is not included in the WSDL file.

When both the game developers are the same (Yes in Step S39), since the game developer of the Game G is considered to have the API definition information of the API α, it is determined that the transmission of the request R has mistakenly taken place during the development of the game. Therefore, in this case, the leakage determination unit 24 determines the significance of the leakage as being "low" as a probability of the leakage of the WSDL file (Step S40), and the process proceeds to Step S42. In contrast, when both the game developers are different (No in Step S39), the developer of the game G cannot be aware of the API definition information of the API α. Therefore, in this case, the leakage determination unit 24 determines that the WSDL file, which indicates the API definition information of the API α, is highly probably leaked, and hence determines the signification of the leakage as being "high" (Step S41), and then the process proceeds to Step S42. Furthermore, an investigation can be made with respect to the fact that the WSDL file indicating the API definition information of the API α is leaked to which game developer, by referring to the game developer DB 25, the game definition information DB 26, and the WSDL DB 27. Specifically, the leakage determination unit 24 refers to the game definition information DB 26 and acquires the game definition information which includes a WSDL ID which is identical with the WSDL ID included in the WSDL information along with the WSDL file, the WSDL information being stored in the WSDL DB 27. The leakage determination unit 24 refers to the game developer DB 25 to acquire the game developer information which includes the game ID list showing the game ID which is identical with the game ID included in the game definition information acquired, thereby specifying a game developer which is the leakage origin of the WSDL file indicated by the API definition information of the API α.

In Step S42, the leakage determination unit 24 notifies the platform developer of occurrence of the leakage of the WSDL file. The notification is done in a way of using a telephone, e-mail, or the like. When the significance of the leakage of the WSDL file is "high," a telephone is used for notification; but when the significance of the leakage of the WSDL file is "low," an e-mail is used for notification. In the case where a telephone is used, the notification may be performed in a manner such that the telephone number of the platform developer is stored in the API releasing device 20 in advance and the telephone number is dialed, which leads to a call to the telephone number. Alternatively, the notification may be performed in a manner such that a communications terminal is additionally connected with the API releasing device 20, and the telephone number which is stored beforehand is dialed with the communications terminal, which leads to a call being made. In the case where an e-mail is used, the notification may be performed in a manner such that the API releasing device 20 has the e-mail address of the platform developer which is stored beforehand, creates an e-mail which includes the e-mail address and the content that the leakage of the WSDL file has occurred, and sends the e-mail. After that, the leakage determination unit 24 returns an authority error to the request reception unit 23 (Step S43). When the request reception unit 23 receives this authority error, the process proceeds to Step S33. In Step S33, the request reception unit 23 transmits the error message which reports the fact that the authentication of the game G failed, to the game server of the game G.

In this way, according to the first embodiment, the API releasing device 20 allocates a unique service release address to each game, and creates an individual WSDL file, thereby making a release. Because of this, when the WSDL file is leaked out and a request is transmitted which requests permission of use of a special API by a game that cannot be aware of the API definition information of the special API, the API releasing device 20 can discard the request. Namely, the API releasing device 20 can detect and prohibit the illegal use of an API. In addition, the API releasing device 20 can specify the leakage origin of the WSDL file. As a result, it is possible to suppress the leakage of the WSDL file and make the leakage origin of the WSDL file take legal responsibilities.

Second Embodiment

Next, an information processing device and a program according to a second embodiment will be described. Furthermore, as for components which are in common with the configuration of the first embodiment described above, those are described using the same reference numerals or symbols, or not described redundantly.

Like the first embodiment, when a platform developer performs an input operation of creating a WSDL file that describes API definition information and a service release address for each game, there is a possibility that description errors occur in the content of a WSDL file. When there is an error in description of a WSDL file, there is a possibility that API definition information of an API that originally should not be released is accidently released. In addition, the reader (the game developer or the like) of the WSDL file may not understand the API definition information. In order to avoid such problems, in the second embodiment, an API releasing device 20 automatically creates a WSDL file.

Figure 8:
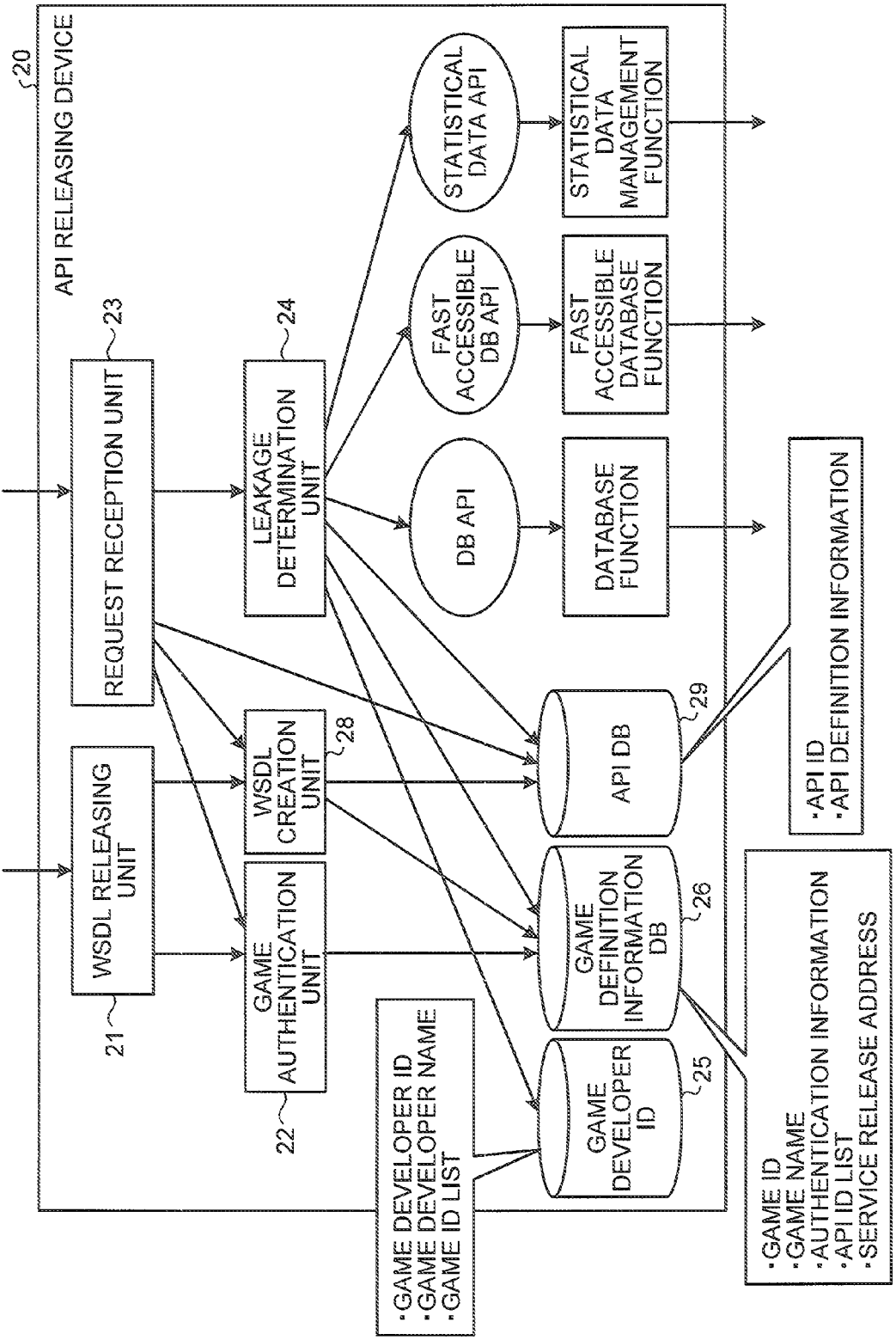
FIG. 8 is a diagram illustrating the functional structure of an API releasing device according to a second embodiment.

FIG. 8 is a diagram illustrating an exemplary functional configuration of the API releasing device 20 according to the second embodiment. The API releasing device 20 according to the second embodiment includes a WSDL creation unit 28 and an API DB 29 in addition to a WSDL releasing unit 21, a game authentication unit 22, a request reception unit 23, a leakage determination unit 24, a game developer DB 25, and a game definition information DB 26; but does not include a WSDL DB 27. The WSDL creation unit 28 is implemented in a way that a CPU of the API releasing device 20 executes various programs stored in a main storage unit or an auxiliary storage unit. The API DB 29 is stored in the auxiliary storage unit such as a HDD. In addition, in the second embodiment, game definition information which is stored in the game definition information DB 26 differs from that as in the configuration of the above-mentioned first embodiment. Part of the function of the WSDL releasing unit 21 and part of the function of the request reception unit 23 differ from those as in the configuration of the above-described first embodiment.

The API DB 29 stores therein API information regarding APIs offered by the API releasing device 20. The API information includes an API ID and API definition information. The API ID is an ID which is allocated to an API to identify the API. Before a platform developer signs a contract with a game developer, in the API releasing device 20, a platform developer performs an input operation of registering API information regarding an API provided by the API releasing device 20 in the API DB 29, thereby storing the particular API information in the API DB 29.

In the second embodiment, the game definition information which is stored in the game definition information DB 26 includes a game ID, a game name, authentication information, an API ID list, and a service release address. The API ID list indicates API IDs of APIs which are permitted to be used by games. The service release addresses are uniquely allocated to the games, respectively as in the above description.

If a request which requests a WSDL file is received, the WSDL releasing unit 21 requests a game authentication unit 22 to perform a game authentication process as in the first embodiment. However, if the game definition information is received from the game authentication unit 22, in the second embodiment, the WSDL releasing unit 21 transfers this game definition information to the WSDL creation unit 28 to request the WSDL creation unit 28 to create a WSDL file. If the WSDL releasing unit 21 receives a WSDL file created in compliance with this request from the WSDL creation unit 28, the WSDL releasing unit 21 transmits it to a game server.

In an initialization process as described in the first embodiment, the request reception unit 23 requests the WSDL creation unit 28 to create a WSDL file that can be released by the API releasing device 20. Next, if the request reception unit 23 receives a WSDL file which is created in compliance with the request from the WSDL creation unit 28, the request reception unit 23 acquires API definition information and a service release address indicated by the WSDL file, and starts expecting the request which requests use of a web service.

The WSDL creation unit 28 creates a WSDL file by using game definition information and API information in compliance with a request of the WSDL releasing unit 21 or the request reception unit 23. Specifically, the WSDL creation unit 28 acquires the API definition information each piece of which is included in the API information each piece of which includes an API ID indicated by an API ID list included in the game definition information, and creates a WSDL file to correspond to the service release address which is included in the game definition information. The WSDL creation unit 28 transfers the created WSDL file to the WSDL releasing unit 21 or the request reception unit 23 which is a request origin.

Figure 9:
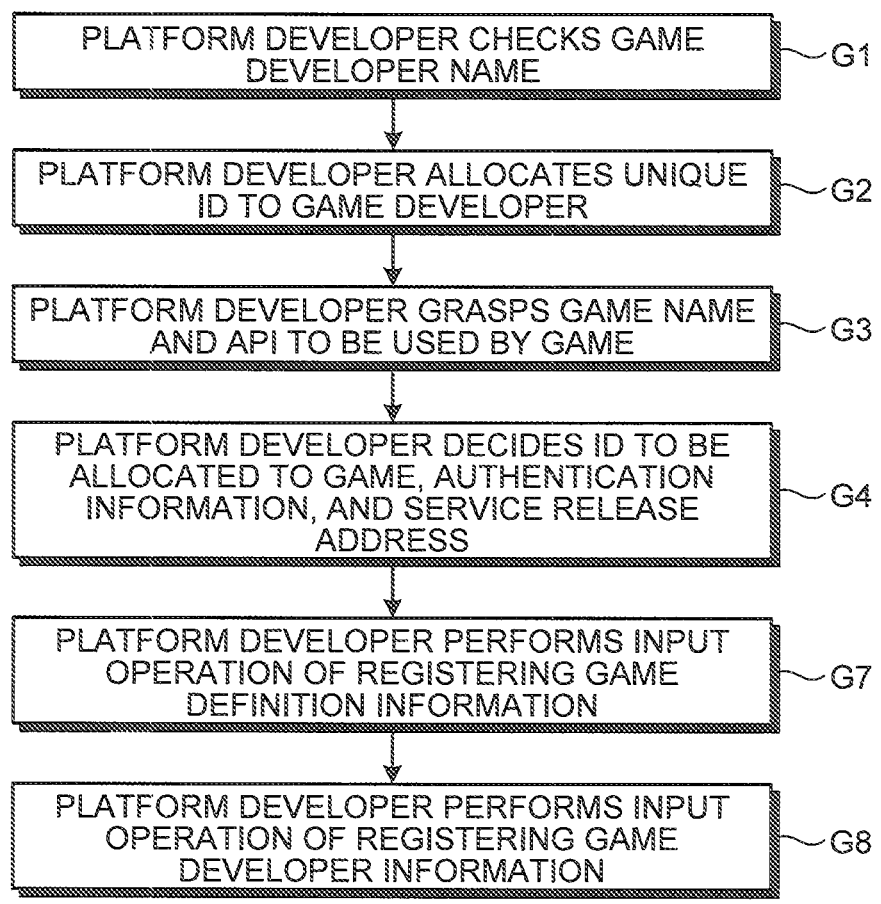
FIG. 9 is a diagram illustrating a business flow at the time of making a contract.

Next, the business flow of a game developer and a platform developer according to the second embodiment will be described. FIG. 9 is a diagram illustrating the business flow at the timing of making a contract, according to the second embodiment. Business steps G1 to G4 are similar to those of the first embodiment. After completion of Business step G4, a platform developer does not perform an input operation of creating a WSDL file and an input operation of registering WSDL information that includes a WSDL file in the WSDL DB 27, but performs Business steps G7 to G8 similar to those as in the above description.

Figure 10:
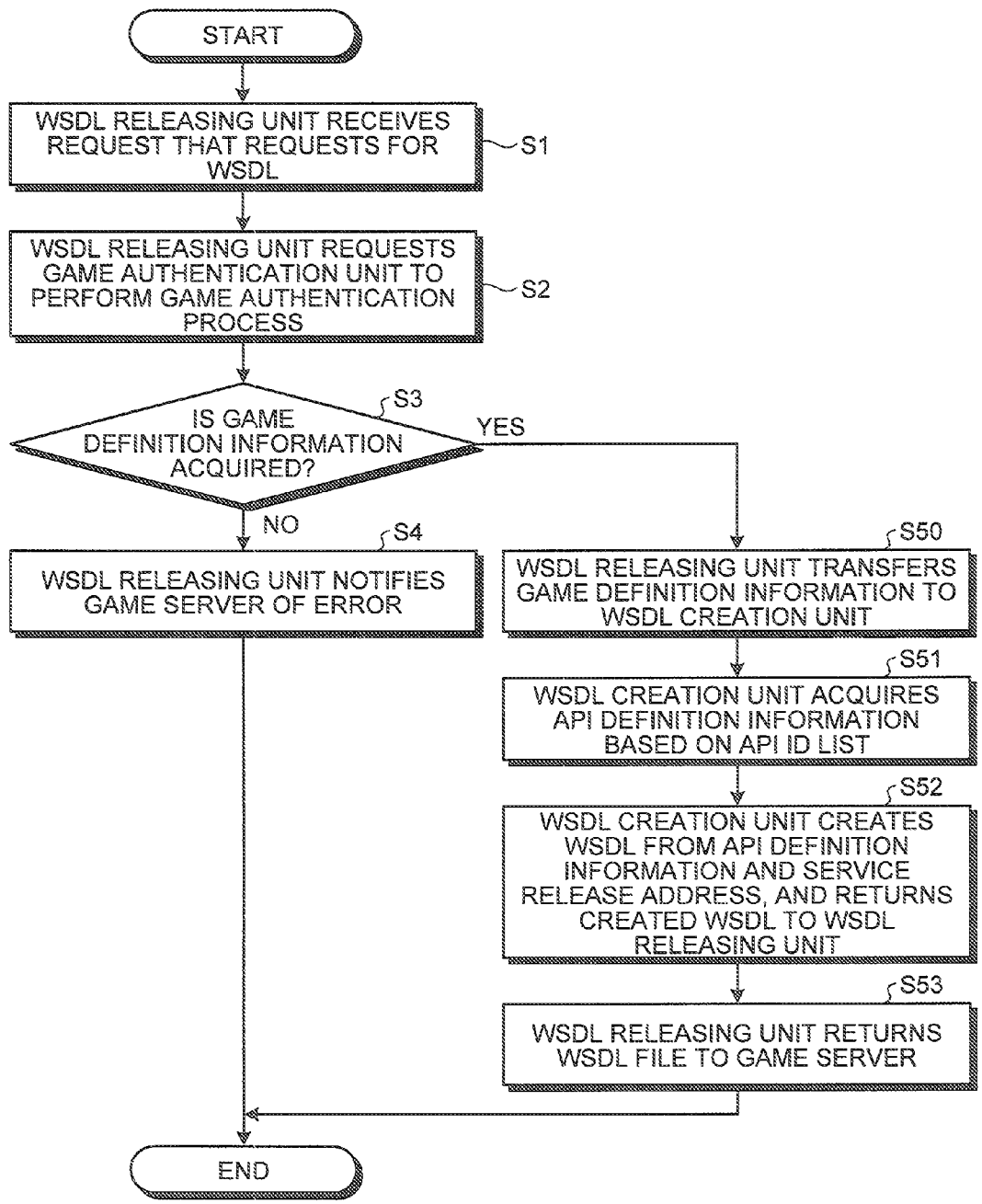
FIG. 10 is a flowchart illustrating the procedure of a process for releasing a WDSL file.

Next, the procedure of a process performed by the API releasing device 20 will be described. With reference to FIG. 10, described first is the procedure that the API releasing device 20 releases a WSDL file in compliance with a request from the game server. Steps S1 to S4 are similar to those of the first embodiment. When game definition information can be obtained in Step S3 (Yes in Step S3), the WSDL releasing unit 21 transfers the game definition information which is obtained, to the WSDL creation unit 28 (Step S50). If the game definition information is received, the WSDL creation unit 28 refers to the API DB 29 and acquires API definition information each piece of which is included in API information each piece of which includes an API ID which is indicated by the API ID list which is included in the game definition information (Step S51). Next, the WSDL creation unit 28 creates a WSDL file which indicates API definition information and a service release address which is included in the game definition information, and transfers this to the WSDL releasing unit 21 (Step S52). If the WSDL file is received, the WSDL releasing unit 21 transmits the WSDL file to the game server (Step S53).

Figure 11:
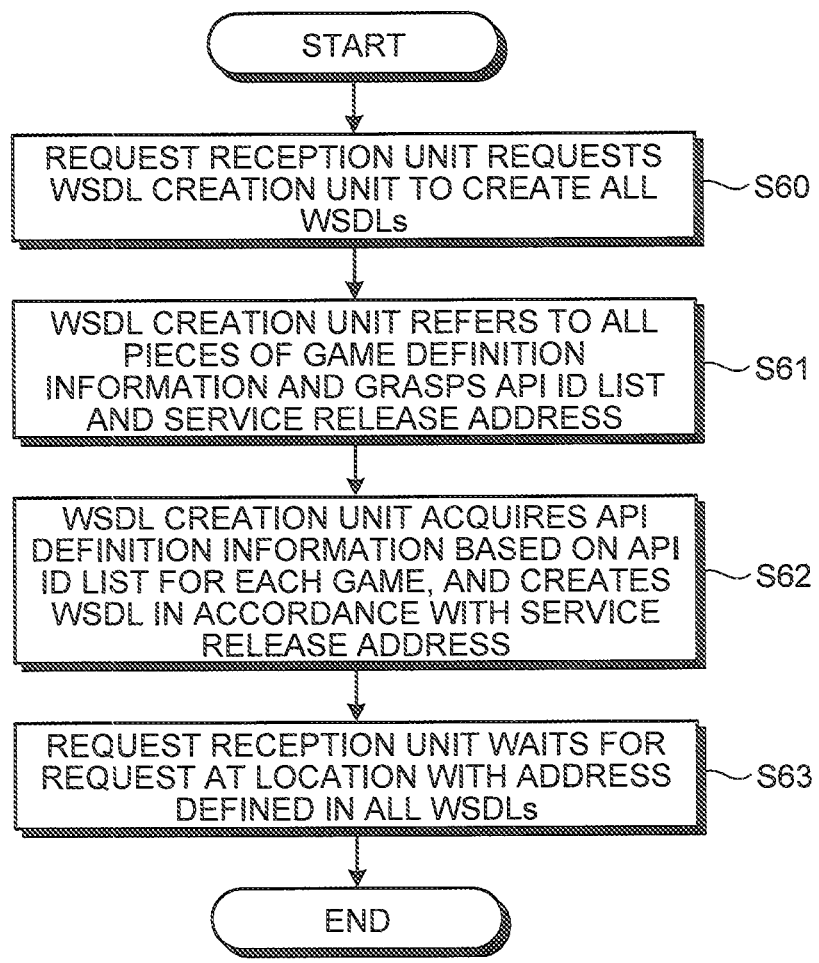
FIG. 11 is a flowchart illustrating an initialization process performed when the API releasing device is activated.

Next, the procedure of a process for a request for API will be described. Here, first described is an initialization process performed when the API releasing device 20 is activated, with reference to FIG. 11. If the API releasing device 20 is activated, the request reception unit 23 requests the WSDL creation unit 28 to create all WSDL files that can be released by the API releasing device 20 (Step S60). The WSDL creation unit 28 refers to all pieces of game definition information which are stored in the game definition information DB 26, and acquires an API ID list and the service release address which are included in the game definition information (Step S61). Next, the WSDL creation unit 28 refers to the API DB 29, acquires API definition information each piece of which is included in the API information each piece of which includes an API ID indicated by an API ID list for each game, and creates a WSDL file which indicates the relevant API definition information, and a service release address which is included in the game definition information of each game (Step S62). In this way, the WSDL creation unit 28 creates, for each game, a WSDL file, and transfers these WSDL files to the request reception unit 23. When the WSDL files are received, the request reception unit 23 acquires API definition information and a service release address which is indicated by each WSDL file, and starts expecting the request which requests use of a Web service (Step S63).

Figure 12:
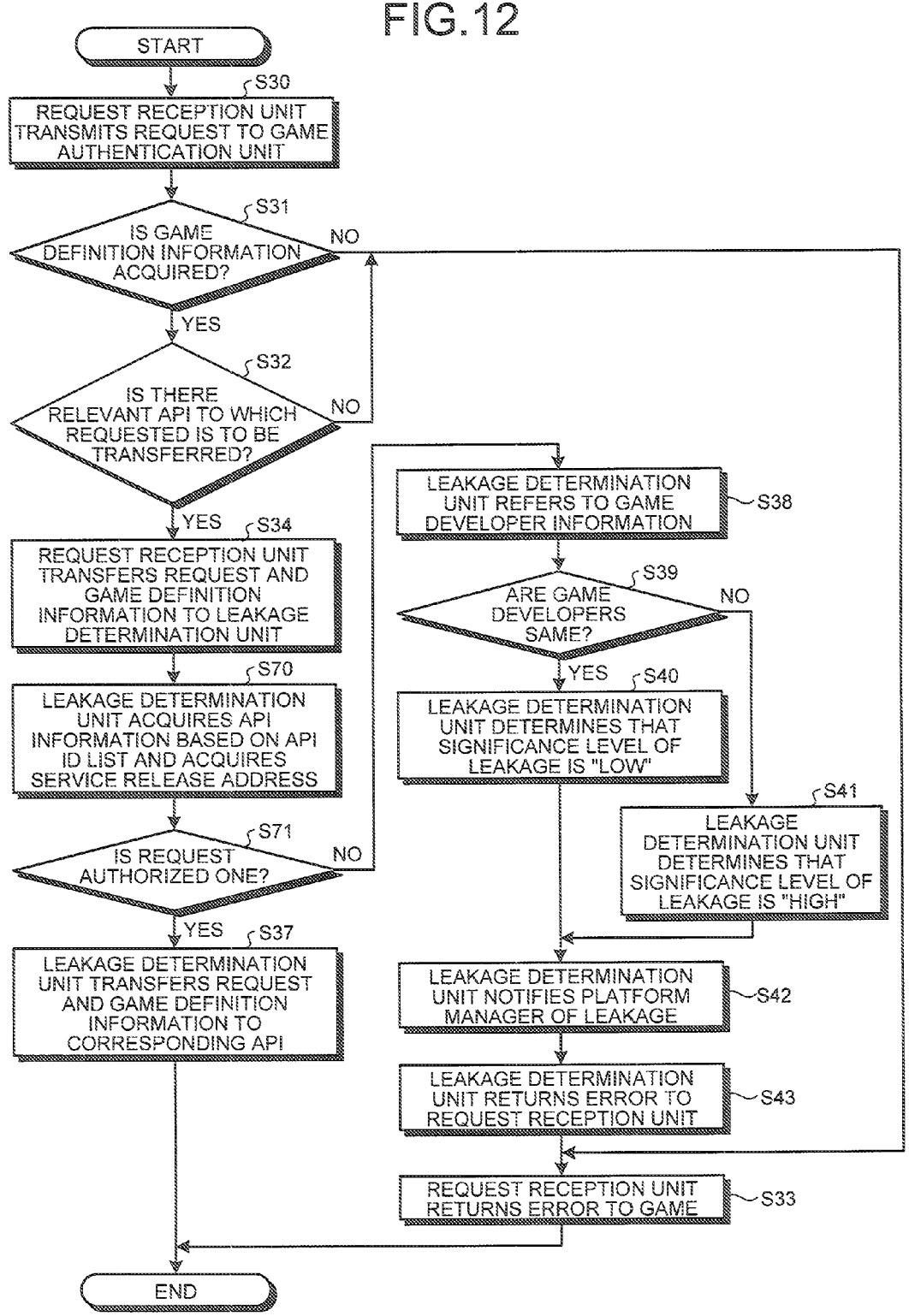
FIG. 12 is a flowchart illustrating the procedure for processing a request that requests permission of use of an API.

With reference to FIG. 12, next described is the procedure of a process performed in a case where the API releasing device 20 receives a request for API, from the game server. In a way similar to the first embodiment, the game server transmits a request for API, to the API releasing device 20. Hereinbelow, this game is referred to as a Game G and this request is referred to as a request R. Steps S30 to S34 are similar to those of the first embodiment. After completion of Step S34, in Step S70, the leakage determination unit 24 acquires API information which includes an API ID indicated by an API ID list which is included in game definition information when the Request R and the game definition information are received. Next, the leakage determination unit 24 checks whether the use of an API α which is requested with the request R is authorized (Step S71). When the following two conditions, (c) and (d), are satisfied, the leakage determination unit 24 determines that the use of the API α requested with the Request R is authorized:

(c) Among pieces of API information which are acquired in Step S70, there is the API information which includes the API definition information of the API α; and (d) A service release address which is added to the request R is identical with a service release address which is included in the game definition information.

In a case where the use of the API α which is requested with the request R is determined as being authorized (Yes in Step S71), the process proceeds to Step S37. Meanwhile, in a case where the use of the API α which is requested with the request R is determined as being unauthorized (No in Step S71), in the same way as in the first embodiment, the leakage determination unit 24 refers to all pieces of game developer information which are stored in the game developer DB 25 (Step S38), and determines whether or not the game developer of the game who are permitted to use the API α is identical with the game developer of the Game G (Step S39). However, in the second embodiment, the details of the determination method differ from those as in the first embodiment. The leakage determination unit 24 refers to the game ID which is indicated by the game ID list which is included in all pieces of game developer information which are stored in the game developer DB 25, and acquires the game developer information which includes the game ID list which indicates the game ID of the Game G. The leakage determination unit 24 refers to the game definition information DB 26, and acquires the game definition information which includes the game ID identical with the game ID which is indicated by the game ID list which is included in the game developer information acquired. The processes up to this point are similar to those as in the first embodiment. After that, the leakage determination unit 24 refers to the API DB 29, and acquires the API information which includes the API ID identical with the API ID which is included in the game definition information acquired. Next, the leakage determination unit 24 determines that the game developer of the game who is permitted to use the API α is the same as the game developer of the game G when API information and a service release address are combined for each piece of game definition information, and the API information regarding the API α is included in any one of the combinations, and determines that both of the game developers are not the same when the API information regarding the API α is not included in any one of the combinations.

Steps S37 and S39 to S43 are similar to those as in the first embodiment. When the WSDL file is determined as being leaked, it is possible to investigate that the WSDL file which indicates the API definition of the API α is released to which game developer by referring to the game developer DB 25, the game definition information DB 26, and the API DB 29. Specifically, the leakage determination unit 24 refers to the game definition information DB 26, and acquires the game definition information which includes the API ID identical with the API ID which is included, along with the API definition information, in the API information which is stored in the API DB 29. The leakage determination unit 24 refers to the game developer DB 25 and acquires the game developer information which includes the game ID list which indicates the game ID identical with the game ID included in the game definition information acquired. In this way, the game developer as the leakage origin of the WSDL file that indicates the API definition information of the API α can be specified.

As described above, in the second embodiment, the API information regarding APIs offered by the API releasing device 20 are stored in the API DB 29 beforehand, and the API ID list which indicates API IDs of APIs which are permitted to be used by a game is included in the game definition information when a contract is made with the game developer. In this way, it is enabled to mechanically create an individual WSDL file by which an individual service release address is allocated to each game. This makes the platform developer need not create the WSDL file. Because of this, a mistake in description of the WSDL can be avoided, and the leakage origin can be specified when the leakage of the WSDL file occurs.

Furthermore, this invention is not limited to the embodiments as described above, but can be implemented with constituent elements being modified within a scope without departing from the spirit thereof at practical phase. In addition, it is possible to form various inventions with appropriate combinations of multiple constituent elements which are disclosed in the above-described embodiments. For example, some constituent elements of all constituent elements in the embodiments may be removed. Furthermore, constituents elements in different embodiments may be appropriately combined as needed.

In the embodiments described above, various programs to be executed by the API releasing device 20 may be configured to be provided in a way that the programs are stored in a computer connected to a network through Internet or the like and downloaded through the network. Alternatively, the various programs may be configured to be provided as a computer program product in a way that the programs are recorded in a computer readable recording medium such as a CD-ROM, a flexible disk (FD), a CD-R, or a digital versatile disk (DVD) in the form of a file of an installable format and an executable format.

In the embodiments described above, the API implemented by the API releasing device 20 is not limited to the examples described above but may be a function such as a user information management function. In addition, the database included in the database device 30 is not limited to the examples described above but may be a user database which stores user data therein. In addition, as the database device 30 that has the game database 31 and the statistical database 32, there may be only one device, or may be a plurality of devices. In addition, in a case where a plurality of database devices 30 exist, at least one of the game database 31 and the statistical database 32 is managed as distributed to the plurality of database devices 30. In addition, the platform 10 may not have the database device 30 but the API releasing device 20 may have at least one of the game database 31 and the statistical database 32, or may have other databases which are accessible from application programs through a Web service API.

In the embodiments described above, games are exemplified as application programs that use a Web service API which is released by the API releasing device 20. However, examples of the application program are not limited to the above ones.

In the embodiments described above, the WSDL file may indicate a port number which expects, for example, a request or an IP address of the API releasing device in addition to the API definition information and service release address.

In the embodiments described above, as a method of transferring a WSDL file to a game developer, an example is presented in which the API releasing device 20 transmits a WSDL file to the game server through the network NT1. However, examples of the method are not limited to that. For example, there are methods: a method of transmitting a WSDL file to a game server using FTP, a method of transmitting a WSDL file using an e-mail, a method of delivering a disk in which a WSDL file is stored to a game developer, using a portable disk, and the like.

In the second embodiment described above, in order to avoid an event that the WSDL creation unit 28 repeatedly creates a WSDL file each time the request reception unit 23 of the API releasing device 20 receives a request that requests a WSDL file, the WSDL file which is created once by the WSDL creation unit 28 may be cached in a main storage unit such as a random access memory (RAM). Furthermore, when the request which requests a WSDL file is received, the request reception unit 23 determines whether or not the WSDL file which is in compliance with the request is cached. When the determination result is affirmative, the cached WSDL file is transmitted to the game server. Conversely, when the determination result is negative, the WSDL creation unit 28 may be requested to create a WSDL file.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device offering various application programming interfaces (APIs) used for enabling application programs to implement various functions, the device comprising:
   a first storage unit configured to store therein, for each of the application programs, a web services description language (WSDL) file indicating API definition information of an API which is permitted to be used by an application program;
   a second storage unit configured to store therein developer information specifying a developer of the application program;
   a releasing unit configured to release, to the application program, a corresponding WSDL file;
   a reception unit configured to receive, through a web service, a request for use of a first API by a first application program;
   a first determination unit configured to determine whether or not the API definition information of the first API is indicated in a first WSDL file, of the WSDL files stored in the first storage unit, corresponding to the first application program, thereby determining whether or not the first application program is authorized for use of the first API; and
   a second determination unit configured to determine whether or not the first WSDL file is leaked, by using the developer information stored in the second storage unit when the first application program is determined as being unauthorized for use of the first API,
   wherein the second determination unit is further configured to determine that, in a case where the first application program is determined as being unauthorized for use of the first API and where the API definition information of the first API is indicated by a second WSDL file corresponding to another application program which is indicated by the developer information to be developed by a developer of the first application program, a probability that the first WSDL file is leaked is low; and to determine that, in a case where the first application program is unauthorized for use of the first API and where the API definition information of the first API is not indicated by the second WSDL file, a probability that the first WSDL file is leaked is high.

2. The device according to claim 1, wherein
   the WDSL file, for each of the application programs further indicates an address allocated to the application program,
   the request received by the reception unit includes a first address, and
   the first determination unit is configured to determine whether or not an address which is indicated by the first WSDL file is identical with the first address included in the request and whether or not the API definition information of the first API is indicated by the first WSDL file, thereby determining whether or not the first application program is authorized for use of the first API.

3. The device according to claim 2, further comprising:
   a third storage unit configured to store therein authentication information of the application programs; and
   an authentication unit configured to authenticate the application programs based on the authentication information stored in the third storage unit, wherein
   the releasing unit is configured to release, to a successfully-authenticated application program, the corresponding WSDL file, and
   the first determination unit is configured to determine, in a case where the first application program is successfully authenticated, whether or not an address indicated by the first WSDL file is identical with the first address included in the request and whether or not the API definition information of the first API is indicated by the first WSDL file, thereby determining whether or not the first application program is authorized for use of the first API.

4. The device according to claim 3, wherein
   the developer information includes developer identification information to identify a developer of the application program and application identification information to identify one or a plurality of application programs that the developer develops, and
   the request received by the reception unit includes first application identification information to identify the first application program.

5. The device according to claim 4, wherein
   the third storage unit stores therein application definition information including the authentication information and the application identification information,
   the request received by the reception unit includes first authentication information; and
   the authentication unit is configured to successfully authenticate the first application program in a case where first application definition information is stored in the third storage unit, the first application definition information including the authentication information is identical with the first authentication information included in the request and the application identification information is identical with the first application identification information included in the request.

6. The device according to claim 5, wherein
   the first storage unit stores therein WSDL information including WSDL identification information to identify a WSDL file,
   the application definition information stored in the third storage unit includes the authentication information, the application identification information, and the WSDL identification information of the WSDL file corresponding to the application program, and
   the determination unit is configured to determine, in a case where the first application program is successfully authenticated, whether or not the first application program is authorized for use of the first API, by determining whether or not an address indicated by the first WSDL file is identical with the first address included in the request, and by determining whether or not the API definition information of the first API is indicated by the first WSDL file.

7. An information processing device offering various application programming interfaces (APIs) used for enabling application programs to implement various functions, the device comprising:
   a first storage unit configured to store therein API definition information of APIs;
   a second storage unit configured to store therein, for each of the application programs, application definition information including API identification information to identify an API which is permitted to be used by an application program;

a third storage unit configured to store therein developer information specifying a developer of the application program;

a creation unit that creates, for each of the application programs, a web service description language (WSDL) file indicating API definition information of an API which is permitted to be used by the application program, using the API definition information and the application definition information;

a releasing unit configured to release, to the application program, a corresponding WSDL file;

a reception unit configured to receive, through a web service, a request for use of a first API by a first application program;

a first determination unit configured to determine whether or not the API definition information of the first API is included in first application definition information corresponding to the first application program, thereby determining whether or not the first application program is authorized for use of the first API; and a second determination unit configured to determine whether or not the first WSDL file is leaked, by using the developer information stored in the third storage unit when the first application program is determined as being unauthorized for use of the first API, wherein the second determination unit is configured to determine that, in a case where the first application program is determined as being unauthorized for the use of the first API and where the API definition information of the first API is included in second application definition information corresponding to another application program which is indicated by the developer information to be developed by a developer of the first application program, a probability that a first WSDL file indicating the API definition information of the first API is leaked is low; and to determine that, in a case where the first application program is determined as being unauthorized for use of the first API and where the API definition information of the first API is not included in the second application definition information, a probability that the first WSDL file is leaked is high.

8. The device according to claim 7, wherein
the application definition information further includes, for each of the application programs, an address allocated to the application program,
the request received by the reception unit includes a first address, and
the first determination unit is configured to determine whether or not an address included in the first application definition information is identical with the first address included in the request and whether or not the API definition information of the first API is included in the first application definition information, thereby determining whether or not the first application program is authorized for use of the first API.

9. The device according to claim 8, wherein
the application definition information further includes authentication information of the application program,
the device further comprises an authentication unit configured to authenticate the application programs based on the authentication information included in the application definition information,
the releasing unit releases, to a successfully-authenticated application program, the corresponding WSDL file, and
the first determination unit is configured to determine, in a case where the first application program is successfully authenticated, whether or not an address included in the first application definition information is identical with the first address included in the request and whether or not the API definition information of the first API is included in the first application definition information, thereby determining whether or not the first application program is authorized for use of the first API.

10. The device according to claim 9, wherein
the developer information includes developer identification information to identify a developer of the application program and the application identification information to identify one or a plurality of application programs that the developer develops,
the request received by the reception unit includes first application identification information to identify the first application program.

11. A computer program product comprising a non-transitory computer readable medium including program instructions, wherein the instructions, when executed by a computer that offers various Application Programming Interfaces (APIs) that are used for enabling application programs to implement various functions, cause the computer to perform operations comprising:

storing, for each of the application programs, a web service description language (WSDL) file indicating definition information of an API which is permitted to be used by an application program;

storing developer information specifying a developer of the application program;

releasing, to the application program, a corresponding WSDL file;

receiving, through a web service, a request for use of a first API by a first application program;

determining whether or not the first application program is authorized for use of the first API, by determining whether or not the definition information of the first API is indicated in a first WSDL file, of the WSDL files, corresponding to the first application program;

determining whether the first WSDL file is leaked, by using the developer information when the first application program is determined as being unauthorized for use of the first API;

determining that, in a case where the first application program is determined as being unauthorized for use of the first API and where the API definition information of the first API is indicated by a second WSDL file corresponding to another application program which is indicated by the developer information to be developed by a developer of the first application program, a probability that the first WSDL file is leaked is low; and determining that, in a case where the first application program is unauthorized for use of the first API and where the API definition information of the first API is not indicated by the second WSDL file, a probability that the first WSDL file is leaked is high.

12. A computer program product comprising a non-transitory computer readable medium including program instructions, wherein the instructions, when executed by a computer that offers various Application Programming Interfaces (API) that are used for enabling application programs to implement various functions, cause the computer to perform operations comprising:

storing API definition information of APIs;

storing, for each of the application programs, application definition information including API identification information to identify an API which is permitted to be used by an application program;

storing developer information specifying a developer of the application program;

creating, for each of the application programs, a web service description language (WSDL) file indicating API definition information of an API which is permitted to be used by the application program, using the API definition information and the application definition information;

releasing, to the application program, a corresponding WSDL file;

receiving, through a web service, a request for use of a first API by a first applications program;

determining whether or not the first application program is authorized for use of the first API, by determining whether or not the API definition information of the first API is included in first application definition information corresponding to the first application program;

determining whether or not the first WSDL file is leaked, by using the developer information when the first application program is determined as being unauthorized for use of the first API;

determining that, in a case where the first application program is determined as being unauthorized for the use of the first API and where the API definition information of the first API is included in second application definition information corresponding to another application program which is indicated by the developer information to be developed by a developer of the first application program, a probability that a first WSDL file indicating the API definition information of the first API is leaked is low; and determining that, in a case where the first application program is determined as being unauthorized for use of the first API and where the API definition information of the first API is not included in the second application definition information, a probability that the first WSDL file is leaked is high.

* * * * *